United States Patent [19]

Ogawa et al.

[11] Patent Number: 5,240,774
[45] Date of Patent: Aug. 31, 1993

[54] FLUOROCARBON-BASED COATING FILM AND METHOD OF MANUFACTURING THE SAME

[75] Inventors: Kazufumi Ogawa, Hirakata; Mamoru Soga, Osaka, both of Japan

[73] Assignee: Matsushita Electric Industrial Co., Ltd., Kadoma, Japan

[21] Appl. No.: 774,827

[22] Filed: Oct. 11, 1991

[30] Foreign Application Priority Data

Oct. 25, 1990 [JP] Japan .................................. 2-289127

[51] Int. Cl.$^5$ .............................................. B32B 9/04
[52] U.S. Cl. ................................ 428/411.1; 156/278; 204/157.64; 204/157.74; 428/421; 428/422; 428/325; 428/447; 428/457; 428/435; 428/688
[58] Field of Search .................... 428/411.1, 447, 421, 428/457, 688

[56] References Cited

U.S. PATENT DOCUMENTS 4,539,061  4/1985  Sagiv .................................. 156/278
4,673,474  6/1987  Ogawa .......................... 204/157.64
4,863,794  9/1989  Fujii .................................... 428/325
4,961,996 10/1990  Carre et al. ........................ 428/421

FOREIGN PATENT DOCUMENTS 0363924 10/1989 European Pat. Off. .
0386784  3/1990 European Pat. Off. .

OTHER PUBLICATIONS

Netzer et al., "Thin Solid Films" 99:235-241 (1983).
Japan Society of Applied Physics Catalog No.: AP 901110-03.
Ogawa et al., "Langmuir" 6(4):851-856 (1990).
Mullin et al., "The American Physical Society", 39(7):3745-3747 (Apr. 1, 1989).
Netzer et al., "J. Am. Chem Soc." 105:674-676 (1983).
World Patents Index Latest, Derwent Publications Ltd., London, GB; AN 86-065417 & JP-A-61 016 901 (Hitachi Cable KK), Jan. 24, 1986 (abstract).

Primary Examiner—Patrick J. Ryan
Assistant Examiner—Abraham Bahta
Attorney, Agent, or Firm—Fish & Richardson

[57] ABSTRACT

Disclosed is a step of contacting a substrate having a surface containing hydroxyl groups with a non-aqueous solution containing a material having a chrolosilyl group, a step of coating the substrate with a non-aqueous solvent containing a compound having a fluorocarbon group and a chlorosilane group or a solvent containing a compound containing a fluorocarbon group and an alkoxysilane and a step of baking the substrate after the contacting and coating steps a fluorocarbon-based polymer coating film chemically bonded to the substrate surface can be obtained. Wherein the hydroxyl groups on the substrate surface and chlorosilyl groups of the material having a chrolosilyl group are reacted to form a thin film having a large number of silanol groups (—SiOH) capable of connecting the polymer coating film to the substrate.

5 Claims, 6 Drawing Sheets

FLUOROCARBON-BASED COATING FILM AND METHOD OF MANUFACTURING THE SAME

FIELD OF THE INVENTION

This invention relates to a fluorocarbon-based polymer coating film and method of manufacturing a fluorocarbon-based polymer coating film used for on apparatus or the like requiring heat-resistant, weather-resistant and wear-resistant coating, for instance electric apparatuses such as hot plates and rice cooking machines, vehicles, and industrial apparatus etc.

BACKGROUND OF THE INVENTION

Fluorocarbon-based polymer coating films have been used extensively and are manufactured by making the surface of an Al substrate rough by means of a brush or chemical etching, then coating the rough surface with a primer or the like and then with a paint suspending fine particles of a fluorocarbon-based material such as polytetrafluoroethylene in ethanol or the like and then carrying out drying and baking at about 400° C. for about one hour to fix the fluorocarbon-based polymer to the substrate surface of the material.

This method of manufacture is simple. However, since the polymer and substrate are bonded together merely by an anchor effect, there is a limit in the adhesion of the polymer to the substrate. The method is insufficient in view of such performance as mechanical strength as a method of manufacturing fluorocarbon-based coating films used for apparatus or the like requiring heat-resistant, weather-resistant and wear-resistant coating, for instance such electric apparatus as hot plates and rice cooking apparatus, vehicles and industrial apparatus etc.

SUMMARY OF THE INVENTION

In view of the above drawbacks in the prior art method, it is an object of the present invention to provide a forming a fluorocarbon-based coating layer or film having satisfactory adhesion to a substrate and pinhole-free, thereby improving the performance of an apparatus or the like requiring heat-resistant, weather-resistant and wear-resistant coatings, for instance such electric apparatuses as hot plates and rice cooking apparatus, vehicles and industrial apparatus etc.

The primary objective of this invention is to provide a fluorocarbon-based polymer coating film comprising at least a siloxane film formed as a inner layer and a fluorocarbon-based polymer film formed as an outer layer on the surface of a substrate, the substrate surface and the inner layer are bonded with covalent bonds, and the inner layer and the outer layer are bonded with covalent bonds.

Another objective of this invention is to provide a method of manufacturing a fluorocarbon-based polymer coating film comprising a step of contacting a substrate having hydroxyl groups on a surface with a non-aqueous solvent containing a material with a chrolosilyl group, a step of coating said substrate surface with either a non-aqueous solvent containing a compound having a fluorocarbon group and a chlorosilyl group or a solvent containing a compound having a fluorocarbon group and alkoxysilane group, and a step of baking the substrate after the contacting step and coating step.

Another objective of this invention is to provide a method of manufacturing a fluorocarbon-based polymer coating film comprising a step of contacting a substrate having a surface containing hydroxyl groups with a non-aqueous solvent containing a material having a chlorosilyl group, a step of washing the substrate with a non-aqueous solvent to remove the material without reaction, a step of coating the substrate with either a non-aqueous solvent containing a compound having a fluorocarbon group and a chlorosilyl group or a solvent containing a compound having a fluorocarbon group and alkoxysilyl group.

It is preferable in this invention that both of the covalent bonds connecting between the substrate surface and the inner layer, and the inner layer and the outer layer are siloxane bonds.

It is preferably in this invention that the inner layer is formed with a siloxane-based monomolecular film.

It is preferable in this invention that the substrate is made from a member of a group consisting of metals, ceramics and plastics.

It is preferable in this invention that the substrate is made of a plastic material treated in a plasma atmosphere containing oxygen.

It is preferable in this method invention that the material having a chlorosilyl group contains a member of a group consisting of $SiCl_4$, $SiHCl_3$, $SiH_2Cl_2$ and $Cl-(SiCl_2O)_n-SiCl_3$ (n being an integer, prefer 1 to 3).

It is preferable in this method invention that the compound having a fluorocarbon group and a chlorosilyl group is represented by a formula $CF_3-(CF_2)_n-(R)_m-SiX_pCl_{3-p}$ where n represents 0 or an integer, R represents an alkyl group or a hydrocarbon substitute group containing $C=C$, $C\equiv C$, a silicon atom or a hydrogen atom, m represents 0 or 1, X represents a hydrogen atom, an alkyl group, an alkoxy group, a fluorine-containing alkoxy group or a fluorine-containing alkyl group, p represents 0, 1 or 2.

It is preferable in this method invention that the compound having a fluorocarbon group and an alkoxysilane group is represented by a formula

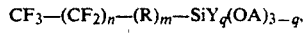

$$CF_3-(CF_2)_n-(R)_m-SiY_q(OA)_{3-q}.$$

where n represents 0 or an integer, R represents an alkyl group or a hydrocarbon substitute group containing $C=C$, $C\equiv C$, a silicon atom or an oxygen atom, m represents 0 or 1, Y represents a hydrogen atom, an alkyl group, an alkoxy group, a fluorine-containing alkoxy group or a fluorine-containing alkyl group, OA represents an alcohol group or an alkoxy group, A represents a hydrogen atom or an alkyl group, and q represents 0, 1 or 2.

It is preferable in this method invention that the material represented by a formula $SiX_xCl_{4-s}$ where X represents a hydrogen atom or an alkyl group, and s represents 0, 1 or 2 is added to a non-aqueous solvent containing a compound having a fluorocarbon group and a chlorosilyl group.

It is preferable in this method invention that the material represented by a formula $SiY_t(OA)_{4-t}$ where Y represents an alkyl group, OA represents an alcohol group or an alkoxy group, A represents a hydrogen atom or an alkyl group, and t represents 0, 1 and 2 is added to solvent containing a compound having a fluorocarbon group and ;an alkoxysilane group.

It is preferable in this method invention that fine particles of a fluorocarbon-based polymer are dispersed in advance in either the non-aqueous solvent containing a compound having a fluorocarbon group and a chlorosilyl group or the solvent containing a compound having a fluorocarbon group and an alkoxysilane group.

DETAILED DESCRIPTION OF THIS INVENTION

Figure 1A:
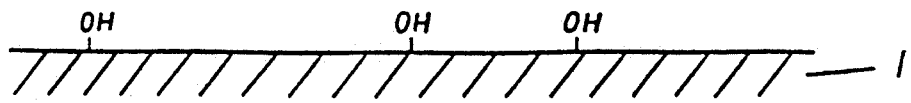
FIG. 1(a) is a schematic sectional view, enlarged in scale to the molecule level showing the surface of a substrate of Example 1 of this invention.

A special feature of the manufacturing a fluorocarbon-based coating film, which comprises a step of contacting a substrate having a surface containing hydroxyl groups with a non-aqueous solvent containing a material having a chrolosilyl group, a step of coating the substrate surface with either a non-aqueous solvent containing a compound having a fluorocarbon group and a chrolosilyl group or a solvent containing a compound having a fluorocarbon group and alkoxysilane group and a step of baking the substrate after the contacting step and the coating step.

A washing step for removing the excess material by washing may be provided between the contacting step and the coating step.

According to the invention, in the step of contacting a substrate having a surface containing hydroxyl groups with a non-aqueous solvent containing a material having a plurality of chrolosilyl groups, the hydroxyl groups on the substrate surface and chrolosilyl groups of the material having chlorosilyl groups are reacted to form on the substrate a thin film having a number of silanol (—SiOH) groups capable of being strongly chemically bonded to the substrate surface.

In addition, after the step of contacting the substrate with a non-aqueous solvent containing a material having chlorosilyl groups, in which the hydroxyl groups on the substrate surface and the chlorosilyl groups of the material are reacted, and the step of removing the non-reacted excess material containing a plurality of chrolosilyl groups remaining on the substrate by washing with non-aqueous organic solvent and by further washing with water, only the material bonded to —OH groups on the substrate can form a siloxane-based monomolecular film (inner layer) containing silanol groups (—SiOH).

Further, after the coating step, in which the substrate is coated with a non-aqueous solvent containing a compound having a fluorocarbon group and a chlorosilane group or with a solvent containing a compound having a fluorocarbon group and an alkoxysilane group, by carrying out baking of the coating together with the substrate in an atmosphere containing moisture for 1 hour at about 120° C., a hydrochloric acid removal or alcohol removal reaction is brought out between the mutual chlorosilane groups or alkoxysilane groups in the compound, and between the chlorisilane groups or alkoxysilane groups in the compound and the —SiOH groups of a thin film formed on the substrate surface in a precipitation step, thus forming a fluorocarbon-based polymer coating film (outer layer) of a polymer having fluorocarbon groups, which film is chemically bonded via —SiO— bonds to a thin film formed on the substrate surface and having a large number of —SiOH bonds.

It is thus possible to form a fluorocarbon-based polymer coating film having very excellent adhesion.

For the substrate having a surface containing hydroxyl groups according to the invention, metal and non-metal elements and ceramics may be used.

According to the invention, since hydrophilic groups formed on the substrate and chlorosilyl groups are reacted each other, where metals are used, commonly termed based metals such as aluminum, copper and iron are suitable.

Further, a material without any oxide film such as plastic substrates are used after a surface treatment to render them hydrophilic. The surface treatment may be carried out by usual means such as a treatment in a plasma atmosphere containing oxygen at 100 W, for instance, for 20 minutes or a corona treatment. However, a plastics have contained —NH groups such as polyamid or polyurethane substrates are not necessary a surface oxygen treatment. For reason, as —NH groups have active hydrogen, it is easy to cause the dehydrochloric acid with chlorosilyl groups of the surface active agents.

As the material containing chlorosilyl groups, $SiCl_4$, $SiHCl_3$, $SiH_2Cl_2$ and $Cl-(SiCl_2O)_n-SiCl_3$ (n being an integer, prefer 1 to 3) may be used.

When a material having a plurality of chlorosilyl groups in molecule such as $Cl-(SiCl_2O)_n-SiCl_3$ is used, the number of silanol groups on the surface is increased to improve the effect of rendering hydrophilic.

As the compound having a fluorocarbon group and a chlorosilane group, those represented by a formula; $CF_3-(CF_2)_n-(R)_m-SiX_pCl_{3-p}$ may be used, where n represents 0 or an integer, R represents an alkyl group or a substitute group containing C=C, C≡C, a silicon atoms or an oxygen atom, m represents 0 or 1, X represents a hydrogen atom, an alkyl group, an alkoxy group, a fluorine-containing alkoxy group or a fluorine-containing alkyl group, and p represents 0, 1 or 2.

As the compound having a fluorocarbon group and an alkoxysilane group those represented by a formula:

$$CF_3-(CF_2)_n-(R)_m-SiY_q(OA)_{3-q}$$

may be used, where n represents 0 or an integer, R represents an alkyl group or a substitute group containing C=C, C≡C, a silicon atom or an oxygen atom. m represents 0 or 1, Y represents a hydrogen atom, an alkyl group, an alkoxy group, a fluorine-containing alkoxy group and a fluorine-containing alkyl group, OA an alcohol group or an alkoxy group, and q represents 0, 1 or 2.

For the adjustment of the hardness of the fluorocarbon-based polymer coating film that is to be formed, a cross-linking agent is added.

More specifically, in the case where a non-aqueous solvent containing a compound having a fluorocarbon group and a chlorosilane group is used, a cross-linking agent represented by a formula; $SiX_sCl_{4-s}$ may be used, where X represents a hydrogen group or a substitute group such as an alkyl group, s represents 0, 1 or 2. In the case of using a solvent containing a compound having a fluorocarbon group and an alkoxysilane group, a cross-linking agent represented by a formula $SiY_t(OA)_{4-t}$ may be used, where Y represents a substitute group such as an alkyl group, OA represents an alcohol group or an alkyl group with A representing a hydrogen atom or an alkyl group, and t represents 0, 1 and 2. In either case, it is possible to adjust the three-dimensional cross-linking degree in the fluorocarbon-based polymer coating film that is formed, thus permitting control of the hardness of the fluorocarbon-based coating film.

Further, it is possible to carry out similar to the case of the prior art fluorocarbon-based coating film by dispersing fine particles of the fluorocarbon-based polymer in a non-aqueous solvent containing a compound having a fluorocarbon group in a chlorosilane group or a solvent containing a compound having a fluorocarbon group and an alkoxysilane group. In this case, fluorocarbon chains, siloxane bonds and molecular chains of the fluorocarbon-based polymer entangle in a molecule level each other, thus a fluorocarbon-based polymer coating film may be formed, which has very high adhesion compared to the prior art coating film.

The invention can widely be applied to the following uses. Materials made of metals, ceramics or plastics, woods and stones etc. are applicable to the substrate. The surface of the substrate can also be coated with paints or the like.

Examples of cutlery: a kitchen knife, scissors, a knife, a cutter, a graner, a razor, hair clippers, a saw, a plane, a chisel, a gimlet, a badkin, bite (cutting tools), the edge of a drill, the edge of a mixer and juicer, a blade of a mill, a blade of a lawnmower, a punch, a straw cutter, a staple of a stapler, a can opener or a surgical knife and the like.

Examples of needles: an acupuncture, a needle, a sewing needle, a matting needle, an injection needle, a surgical needle, a safety pin and the like.

Examples of products in pottery (ceramics) industry: products made of a pottery, a glass, ceramics or an enameled products. For example, such as sanitary potteries (a chamber pot, a wash-bowl, a bathtub etc.), tablewares (a rice-bowl teacup, a dish (plate), a bowl, a teacup, a glass, a bottle, a coffee-pot (siphon), a pan, an earthenware mortar, a cup and the like), vases (a flower bowl, a flowerpot, a bus vase and the like), water tanks (a breeding cistern, an aquarium water tank and the like), chemical experiment appliances (a beaker, a reactor vessel, a test tube, a flask, a laboratory dish, condenser, a mixing rod, stirrer, a mortar, a bat, a syringe etc.) a roof tile, enameled ware, an enameled washbowl, and an enameled pan and the like.

Examples of mirrors: a hand mirror, a full-length mirror, a bathroom mirror, a lavatory mirror, vehicle mirrors (a rear-view mirror, a side mirror, a door mirror etc.), half mirror, road mirrors such as a curve mirror, a shown window glass, a salesroom in the department store, medical care mirrors, a concave mirror, a convex mirror and the like.

Examples of molding parts: dies for press molding, dies for cast molding, dies for injection molding, dies for transfer molding, dies for compression molding, dies for transfer molding, dies for inflation molding, dies for vacuum molding, dies for blow forming, dies for extrusion molding, dies for fiber spinning, a calender processing roll and the like.

Examples of ornaments: a watch, a jewel, a pearl, a sapphire, a ruby, an emerald, a garnet, a cat's eye, a diamond, a topaz, a bloodstone, an aquamarine, a turquoise, an agate, a marble, an amethyst, a cameo, an opal, a crystal, a glass, a ring, a bracelet, a brooch, a tiepin (a stickpin), an earring, a necklace, jewelry made of platinum, gold, silver, copper, aluminium, titanium, tin and those alloy, stainless steel, a glass frame and the like.

Examples of forming molds for food: cake, cookies, bread-baking, chocolate, jelly, ice cream, ovenware, an ice tray and the like.

Examples of cookware: kitchen utensils (a pan and a pot), a kettle, a pot, a frying-pan, a hot plate, a toasting net, a takoyaki plate and the like.

Examples of papers: photogravure paper, hydrophobic and oilphobic paper, poster paper, high-grade pamphlet paper, wrapping paper, package paper, drinking package paper, container paper, printing paper, synthtic insulating paper and the like.

Examples of resin(s): a polyolefin such as a polypropylene and polyethylen, a polyvinylchloride plastic, a polyamide, a polyimide, a polyamideimide, a polyester, an aromatic polyester, a polycarbonate, a polystyrene, a polysulfide, a polysulfone, a polyethersulfone, a polyphenylenesulfide, a phenolic resin, a furan resin, a urea resin, an epoxy resin, a polyurethane, a silicon resin, an ABS resin, a methacrylic resin, an acrylate resin, a polyacetal, a polyphenylen oxide, a polymethylpentene, a melamine resin, an alkyd resin, an unsaturated polyester cured resin and the like.

Examples of rubber(s): styrene-butadien rubber, butyl rubber, nitril rubber, chloroprene rubber, polyurethane rubber, silicon rubber and the like.

Examples of household electrical appliances: a television, a radio, a taperecorder, an audio, a compact disc (CD), a refrigerator of freezing machines, a freezer, an air conditioner, a juicer, a mixer, a blade of an electric fan, a lighting apparatus, a dial plate, a dryer (or drier) for perm and the like.

Examples of sports articles: skis, fishing rods, poles for polevaulting, boats, yachts, surfboards, golf balls, bowling bowls, fishing line (yarn), fishing nets, floats and the like.

Examples applying to vehicle parts:

(1) ABS resin: a lamp cover, an installment pannel, trimming parts, a protector for a motorcycle.

(2) Cellulose plastic: a car mark, a steering wheel (3) FRP (fiber reinforced plastics): a bumper, an engine cover (jacket)

(4) Phenolic resin: a brake (5) Polyacetal: wiper gear, a gas valve (6) Polyamide: a radiator fan (7) Polyarylate (polycondensation polymerization by bisphenol A and pseudo phtalic acid): a direction indicator lamp (or lense), a cowl board lense, a relay case (8) Polybutylene terephtalate (PBT): a rear end, a front fender (9) Poly(amino-bismaleimide): engine parts, a gear box, a wheel, a suspension drive system

(10) Methacrylate resin: a lamp cover lens, a meter pannel and its cover, center mark

(11) Polypropylene: a bumper

(12) Polyphenylen oxide: a radiator grille, a wheel cap

(13) polyurethane: a bumper, a fender, a installment pannel, a fan

(14) Unsaturated polyester resin: a body, a fuel, tank, a heater housing, a meter pannel.

Examples of office supplies: a fountain pen, a ballpoint pen, a propelling pencil (an automatic or a mechanical pencil), a pencil case, a binder, a desk, a chair, a bookshelf, a rack, a telephone stand table, a rule (measure), a drawing instrument and the like.

Example of building materials: materials for a roof, and outer wall and interiors. Roof materials such as a brick, a slate and a tin (a galvanized iron sheet) and the like. Outer wall materials such as wood (including a processed manufactured wood), mortar, concrete, ceramics sizing, a metalic sizing, a brick, a stone, plastics, and a metal like aluminium. Interior materials such as wood (including a processed one), a metal like aluminium, plastics, paper, fiber and the like.

Examples of building stones: granite, marble and other used for such as a building, a building material, an architecture, an ornament, a bath, a grave, a monument, a gatepost, a stone wall, a paving stone and the like.

Examples of musical instruments and sound apparatus: a percussion instrument, a stringed instrument, a keyboard instrument, a woodwind instrument, the brass and others, and sound apparatus such as a microphone, a speaker. To be concrete, there are musical instruments such as a drum, a cymbal, a violin, a cello, a guitar, a koto (harp), a piano, a flute, a clarinet, a bamboo flute and a horn, and sound apparatus such as a microphone, a speaker and a earphone and the like.

Examples of a thermos bottle, a vacuum bottle, a vacuum vessel and the like.

Examples of a highly resisting voltage insulator such as a power supplying insulator or a spark plug, which have a highly hidrophobic oilphobic and prevention of contamination effect.

As has been described in the foregoing, the method of manufacturing a fluorocarbon-based coating film according to the invention comprises a step of contacting a substrate having the surface thereof containing hydroxyl groups with a non-aqueous solution containing a material containing a chlorosilyl group, a step of coating the substrate with a non-aqueous solution containing a compound containing a fluorocarbon group and a chlorosilane group and a solution containing a compound containing a fluorocarbon group and an alkoxysilane group and a step of baking the substrate after the contacting and coating steps. Thus, a fluorocarbon-based coating film excellent in the hydrophobic and oil-repellent properties can be formed on the surface of a hydrophilic substrate in a state of strongly chemically bonded to the substrate, highly density, without any pinhole, with a uniform thickness and very thinly. It is thus possible to provide a fluorocarbon-based coating film having high durability and high performance.

Now, examples will be described with reference to FIGS. 1 to 4.

EXAMPLE 1

A hydrophilic substrate 1, i.e., a glass substrate, was prepared as shown in FIG. 1(a).

The substrate 1 was coated with what was obtained by dissolving 1% wt of Cl—(SiCl$_2$O)$_2$—SiCl$_3$ as material having a chlorosilyl group in chloroform solvent.

Also, on the surface of the substrate 1, hydrophilic —OH substitute groups were contained. Thus, a hydrochloric acid removal reaction (dehydrochloric acid) was brought about on the surface to fix molecules to the surface of the substrate 1 via —SiO— bonds, for example as shown by the formula [1];

formula [1]

Figure 1B:
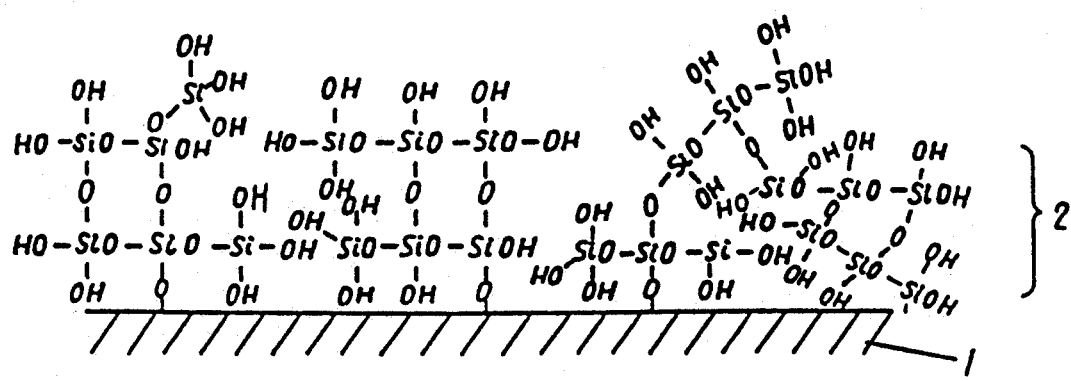
FIG. 1(b) is a schematic sectional view, enlarged in scale to the molecule level showing the siloxane polymer film (inner layer) on the surface of a substrate of Example 1 of this invention.

With subsequent drying in an atmosphere containing moisture form water content, a siloxane polymer coating film 2 as shown in FIG. 1(b) was formed with hydrochloric acid removal reaction between the moisture and —Cl groups without being reacted with the substrate 1.

The siloxane polymer coating film 2 thus formed was bonded to the surface of the substrate 1 via chemical bonds of —SiO— and thus difficult to be separated.

The siloxane polymer coating film 2 had a large number of —SiOH bonds on the surface.

Figure 1C:
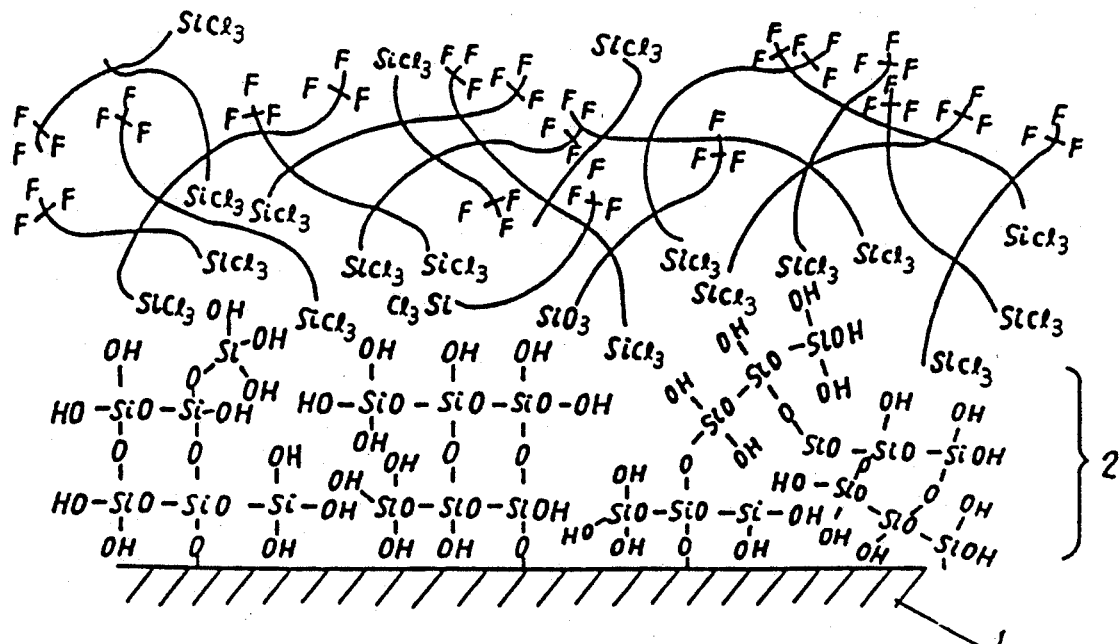
FIG. 1(c) is a schematic sectional view, enlarged in scale to the molecule level showing the fluorocarbon-based monomolecular coating film on the siloxane polymer film (inner layer) of Example 1 of this invention.
Figure 1D:
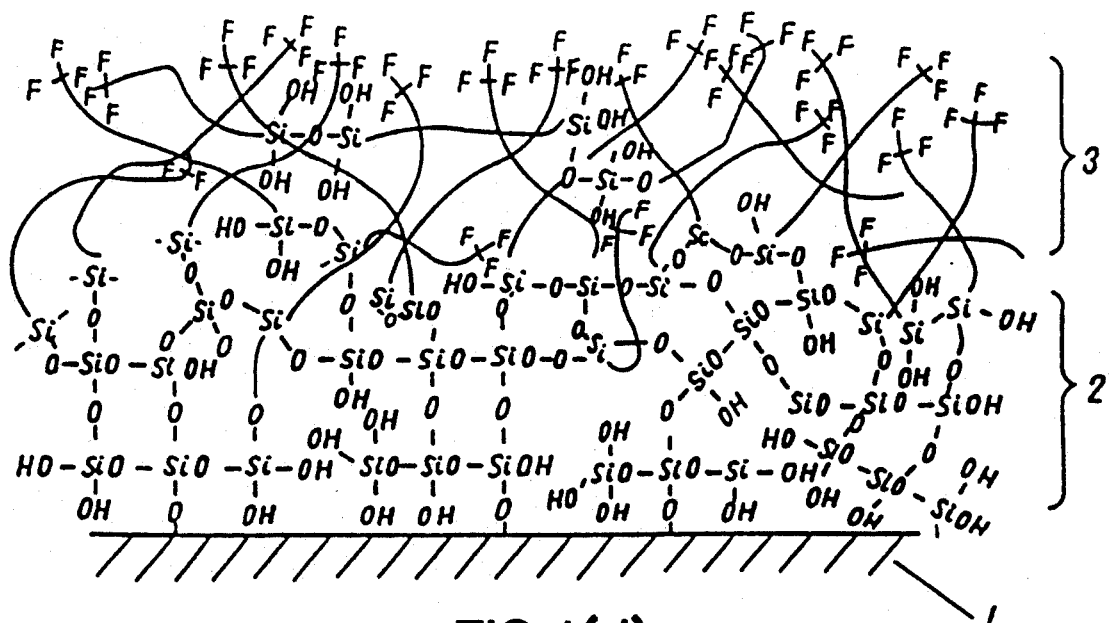
FIG. 1(d) is a schematic sectional view, enlarged in scale to the molecule level showing the fluorocarbon-based polymer (outer layer) and siloxane polymer film (inner layer) on the surface of a substrate of Example 1 of this invention.

Accordingly, a solution containing 80% wt n-hexadecane, 12% wt carbon tetrachloride and 8% wt chloroform was prepared by dissolving in to a concentration of 2.0% wt CF₃CH₂O(CH₂)₁₅SiCl₃ as a non-aqueous solvent containing a compound having a fluorocarbon group and a chlorosilane group, and it was coated on the surface of the substrate 1 having the surface thereof formed with the siloxane polymer coating film 2 having a large number of —SiOH bonds, as shown in FIG. 1(c). Then, by carrying out baking in an atmosphere containing water of moisture at 200° C. for about 30 minutes, a hydrochloric acid removal reaction was brought about between the chlorosilyl groups of fluorine-containing chlorosilane-based surface active agent and exposed —OH groups of the siloxane polymer coating film 2 to form covalent bonds such as the following formula [2];

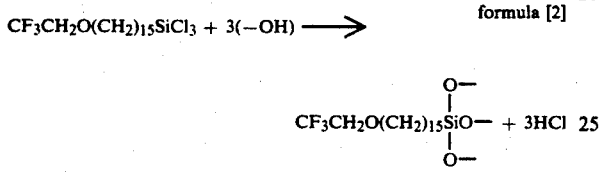

formula [2]

In this way, a fluorocarbon-based polymer coating film 3 having a thickness of about 10 to 20 μm was obtained.

This polymer film 3 was not separated at all in a checkerboard test.

Further, by adding 3% wt of SiCl₄ as a cross-linking agent to the non-aqueous solution containing a compound having a fluorocarbon group and a chlorosilane group, a fluorocarbon-based coating polymer film 3 was obtained, which had about two times of the hardness in case of the solvent without SiCl₄ owing to three-dimensional cross-linking shown by —Si(—O—)₃ bonds.

Further by carrying out similar coating by adding 20% wt of fine particles of polytetrafluloroethylene as fluorocarbon-based polymer to the non-aqueous solvent containing a compound having a fluorocarbon group and a chlorosilane group, a fluorocarbon-based coating film to that in the prior art although its hardness was comparable to that in the prior art.

EXAMPLE 2

Figure 2A:
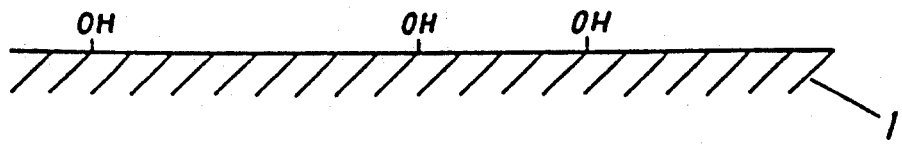
FIG. 2(a) is a schematic sectional view, enlarged in scale to the molecule level showing the surface of a substrate of Example 2 of this invention.

A hydrophilic substrate 1 was prepared as same as in Example 1, as shown in FIG. 2(a).

The substrate 1 was held dipped for about one hour in a solution obtained by dissolving 1% wt of Cl—(SiCl₂O)₂—SiCl₃ as a material having chlorosilyl groups in chloroform solvent as in Example 1. A hydrochloric acid removal reaction thus was brought about on the surface of the substrate 1 because of the presence of hydrophilic —OH groups on the surface to adsorb molecules as shown above formula [1].

Figure 2B:
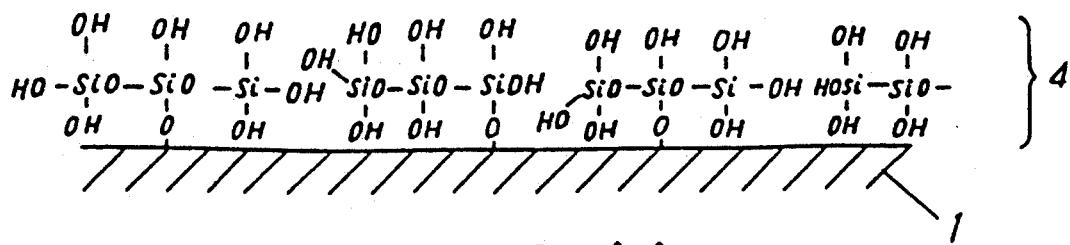
FIG. 2(b) is a schematic sectional view, enlarged in scale to the molecule level showing the siloxane monomolecular film (inner layer) on the surface of a substrate of Example 2 of this invention.

By subsequently carrying out washing with a non-aqueous solvent, i.e., chloroform, and then with water, molecules of Cl—(SiCl₂O)₂—SiCl₃ remaining without being reacted with the substrate 1 were removed to leave a siloxane monomolecular film 4 on the surface of the substrate 1 as shown in FIG. 2(b) and given as the formulas [A] and/or [B] etc.

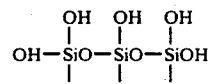

formura [A]

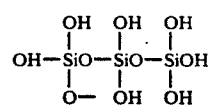

formura [B]

The monomolecular film 4 thus obtained was perfectly bonded to the substrate 1 via chemical bonds of —SiO— and was not easy separated.

The monomolecular film thus formed has many —SiOH bonds on the surface.

Figure 2C:
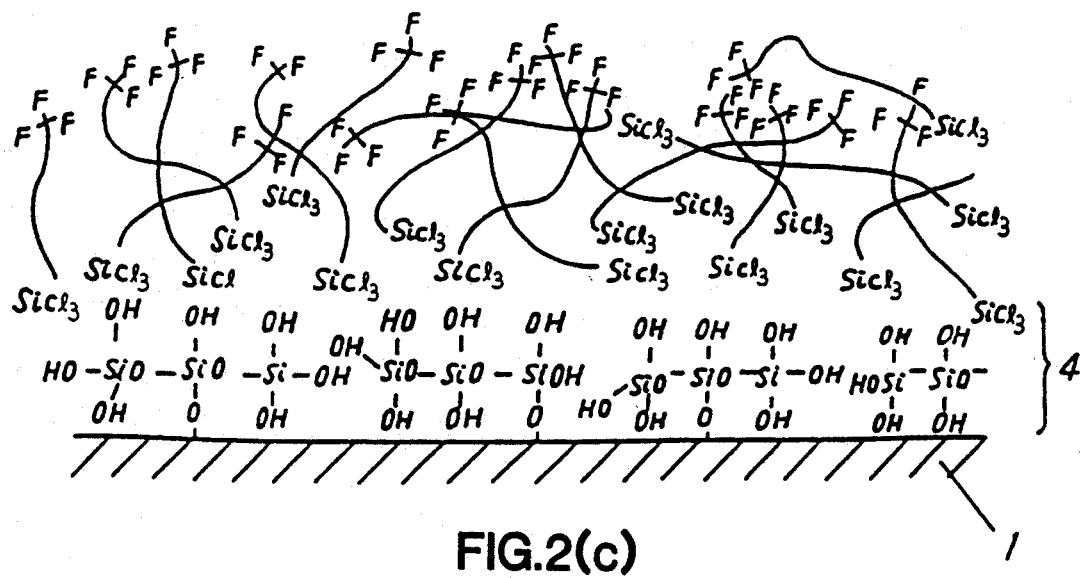
FIG. 2(c) is a schematic sectional view, enlarged in scale to the molecule level showing the fluorocarbon-based monomolecular coating film on the siloxane inner layer of Example 2 of this invention.
Figure 2D:
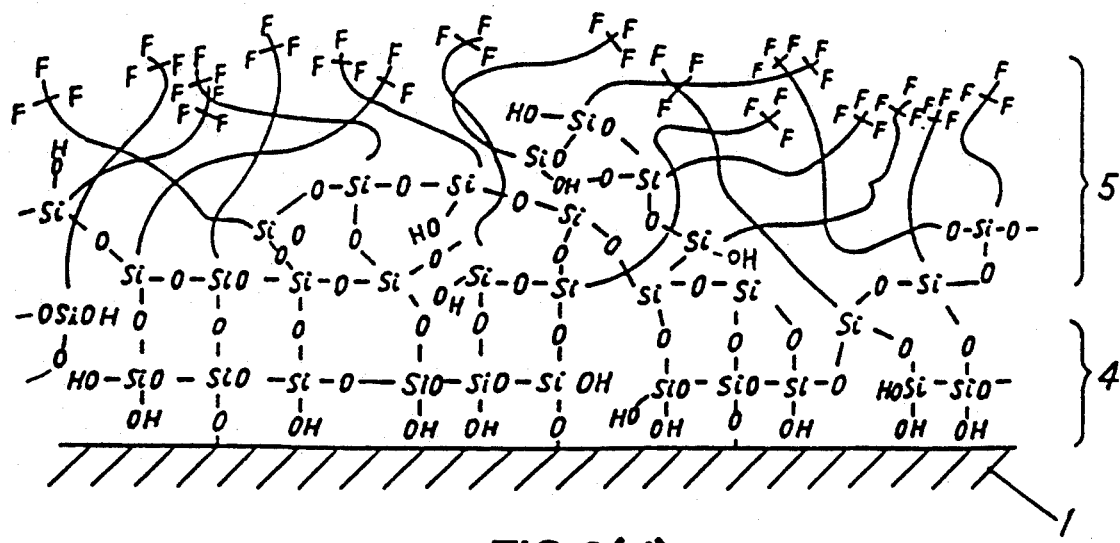
FIG. 2(d) is a schematic sectional view, enlarged in scale to the molecule level showing the fluorocarbon-based polymer film (outer layer) and siloxane monomolecular film (inner layer) on the surface of a substrate of Example 2 of this invention.

Further, a non-aqueous solution containing 80% wt n-hexadecane, 12% wt carbon tetrachloride and 8% wt chloroform was prepared by dissolving to a concentration of 2.0% wt a compound having fluorocarbon group and chlorosilane group such as CF₃(CF₂)₇(CH₂)₂SiCl₃ coated on the surface of the substrate 1 formed on the surface thereof with a monomolecular film 4 having many —SiOH bonds as shown in FIG. 2(c). A reaction was thus brought about between —SiCl bonds and —SiOH groups of the monomolecular layer 4. Then, by carrying out baking in an atmosphere containing water of moisture at 200° C. for about 30 minutes, bonds of the formula [3];

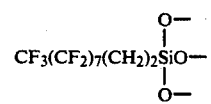

formula [3]

In this way, a polymer film 5 having a thickness of 10 to 20 μm was formed such that it was chemically bonded to the inner-layer, i.e., the siloxane polymer monomolecular film 4.

The coating film was never separated in a checkerboard test.

Further, by adding 15% wt of SiCl₄ as a compound cross-linking agent to the non-aqueous solution containing a compound having a fluorocarbon group and a chlorosilane group, a fluorocarbon-based polymer coating film having a hardness increased by about 5 times could be obtained. Further, by carrying out similar coating using a non-aqueous solution containing a compound having a fluorocarbon group and a chlorosilane group, which was obtained by dispersing about 20% wt of fine particles of a fluorocarbon-based polymer, e.g., polytetrafluoroethylene, a fluorocarbon-based polymer, e.g., polytetrafluoroethylene, a fluorocarbon-based polymer coating film could be obtained, which had a very superior adhesion compared to that in the prior art although its hardness was comparable to that in the prior art.

While this example used CF₃CH₂O(CH₂)₁₅SiCl₃ and CF₃(CF₂)₇(CH₂SiCl₃ as the fluorocarbon-based surface active agent, by adding the C=C or C≡C group to or assembling it in an alkyl chain portion, cross-linking can be obtained by irradiation with an electron beam of about 5 M-rads after the formation of the coating film, and thus it is possible to increase the hardness of the coating film to about 10 times.

Further, as the fluorocarbon-based surface active agent, materials shown below may be used, in addition to the above agents, CF₃(CH₂)₂Si(CH₃)₂(CH₁₅SiCl₃, F(CH$_2$)$_4$(CH$_2$)$_2$Si(CH$_3$)$_2$(CH$_2$)$_9$SiCl$_3$ and CF$_3$COO(CH$_2$)$_{15}$SiCl$_3$.

EXAMPLE 3

Figure 3A:
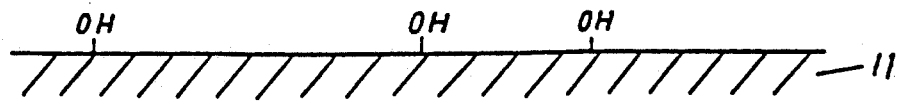
FIG. 3(a) is a schematic sectional view, enlarged in scale to the molecule level showing the surface of a substrate of Example 3 of this invention.

As shown in Example 1, a hydrophilic substrate 11 was prepared as shown in FIG. 3(a).

This substrate 11 was then dipped in a solution obtained by dissolving 1% wt of a material having a chlorosilyl group in a non-aqueous solvent such as a chroloform solvent and then was raised from the solution.

By using Cl—(SiCl$_2$O)$_2$—SiCl$_3$ as a material having a plurality of chlorosilyl groups in molecule, a hydrochloric acid removal reaction was brought about because of the presence of hydrophilic —OH groups on the surface of the substrate 11, thus fixing molecules to the substrate via —SiO— bonds as shown above formula [1].

Figure 3B:
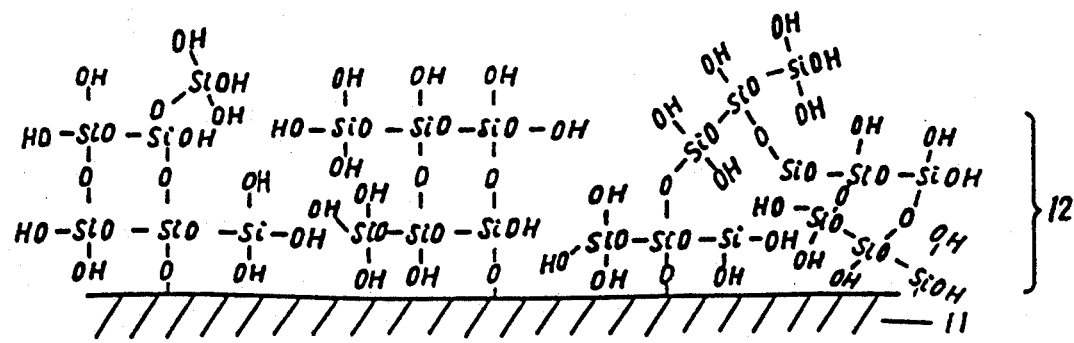
FIG. 3(b) is a schematic sectional view, enlarged in scale to the molecule level showing the siloxane polymer film (inner layer) on the surface of a substrate of Example 3 of this invention.
Figure 3C:
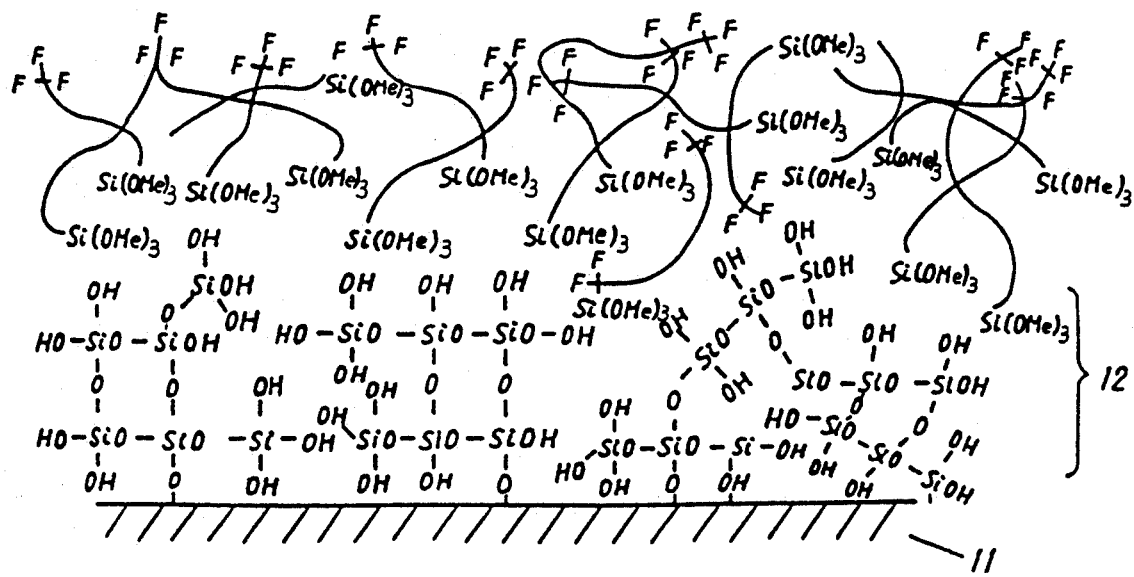
FIG. 3(c) is a schematic sectional view, enlarged in scale to the molecule level showing the fluorocarbon-based polymer film (outer layer) on the siloxane polymer film (inner layer) of Example 3 of this invention.
Figure 3D:
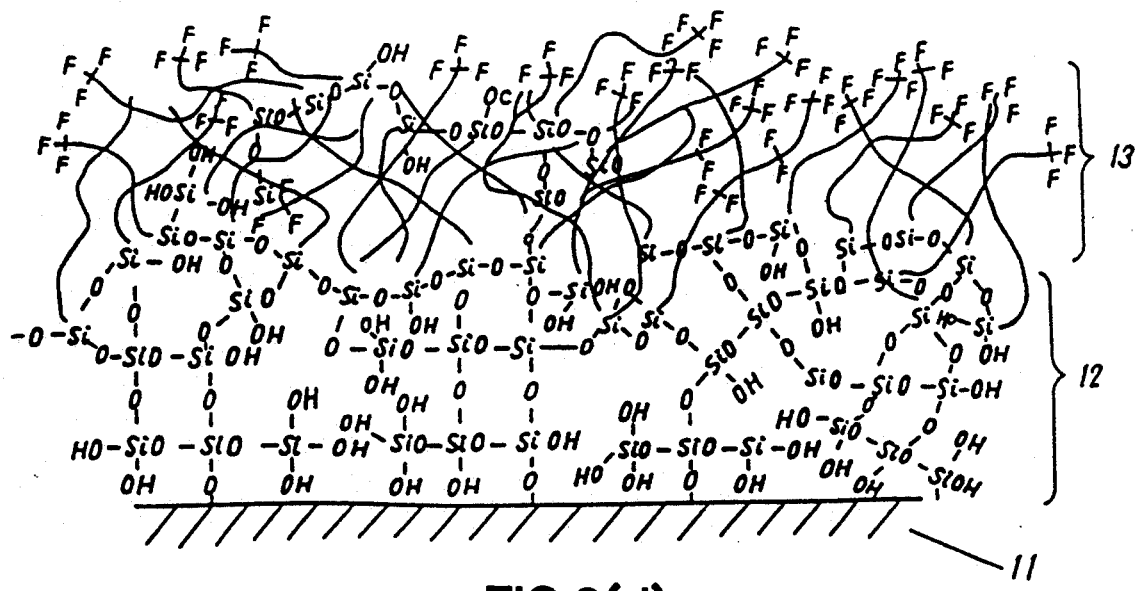
FIG. 3(d) is a schematic sectional view, enlarged in scale to the molecule level showing the fluorocarbon-based polymer film (outer layer) and siloxane polymer film (inner layer) on the surface of a substrate of Example 3 of this invention.

By subsequently carrying out drying in an atmosphere containing of moisture, chlorine in —SiCl groups remaining without being reacted with the substrate 11 was reacted with the water by a hydrochloric acid removal reaction to form a siloxane polymer coating film 12 as shown in FIG. 3(b).

As the siloxane polymer coating film 12 thus obtained was bonded to the surface of the substrate 11 via chemical bonds of —SiO—, it was difficult to be separated.

The siloxane polymer coating film 12 formed also has many —SiOH bonds on the surface.

Further, a solution obtained by dissolving to a concentration of several per cent, for instance 10% wt, a compound having a fluorocarbon group and a alkoxysilane group, for instance CF$_3$(CH$_2$O(CH$_2$)$_{15}$Si(OCH$_3$)$_3$ in an alcohol solvent, for instance ethanol, was sued for coating, followed by baking at 200° C. for about 30 minutes. By doing so, —OH groups exposed to the surface of the siloxane polymer coating film 12 were reacted with alkoxy groups in the fluorine-containing alkoxysilane-based surface active agent an alcohol removal reaction to form such as the formula [4].

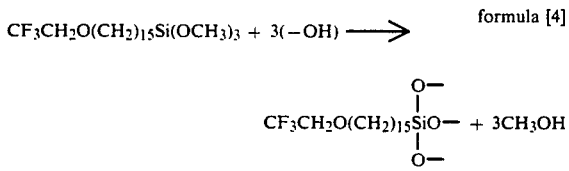

formula [4]

In this way, a polymer film 13 having a thickness of 10 to 20 μm could be obtained.

This polymer film 13 was never separated in a checkerboard test. Further, by adding 5% wt of Si(OCH$_3$)$_4$ as a cross-linking agent to the solvent containing a compound having a fluorocarbon group and an alkoxysilane group shown by the above formula [4], were cross-linked three-dimensionally fluorocarbon-based film via —SiCl(—O—)$_3$ bonds was obtained, which had about two times of the hardness of the film obtained without addition of Si(OCH$_3$)$_4$.

Further, by carrying out similar coating using a solution containing a compound having a fluorocarbon group and an alkoxysilane group, to which 20% wt of fine particles of polytetrafluoroethylene were added as a fluorocarbon-based polymer, a polymer film could be obtained, which had a very superior adhesion compared to that in the prior art although its hardness was comparable to that in the prior art.

EXAMPLE 4

Figure 4A:
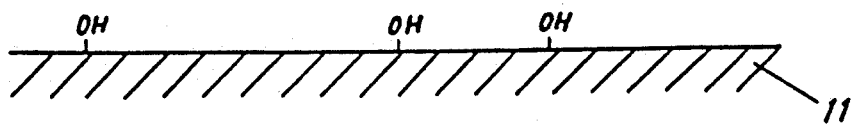
FIG. 4(a) is a schematic sectional view, enlarged in scale to the molecule level showing the surface of a substrate of Example 4 of this invention.

As shown in Example 3, a hydrophilic substrate 11 as shown in FIG. 4(a) was held dipped for about one hour in a non-aqueous solution prepared by dissolving 1% wt of Cl—(SiCl$_2$O)$_2$—SiCl$_3$ as a material containing a chlorosilyl group, for instance, in a chloroform solvent.

Figure 4B:
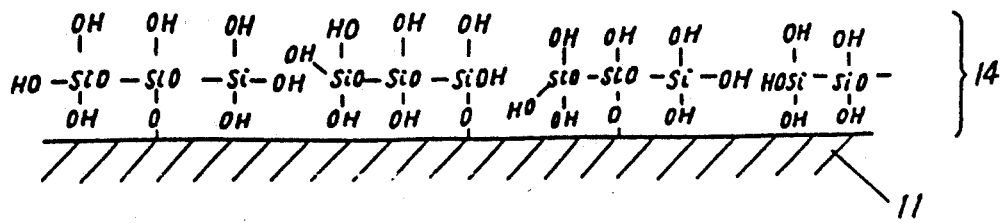
FIG. 4(b) is a schematic sectional view, enlarged in scale to the molecule level showing the siloxane polymer (inner layer) on the surface of a substrate of Example 4 of this invention.
Figure 4C:
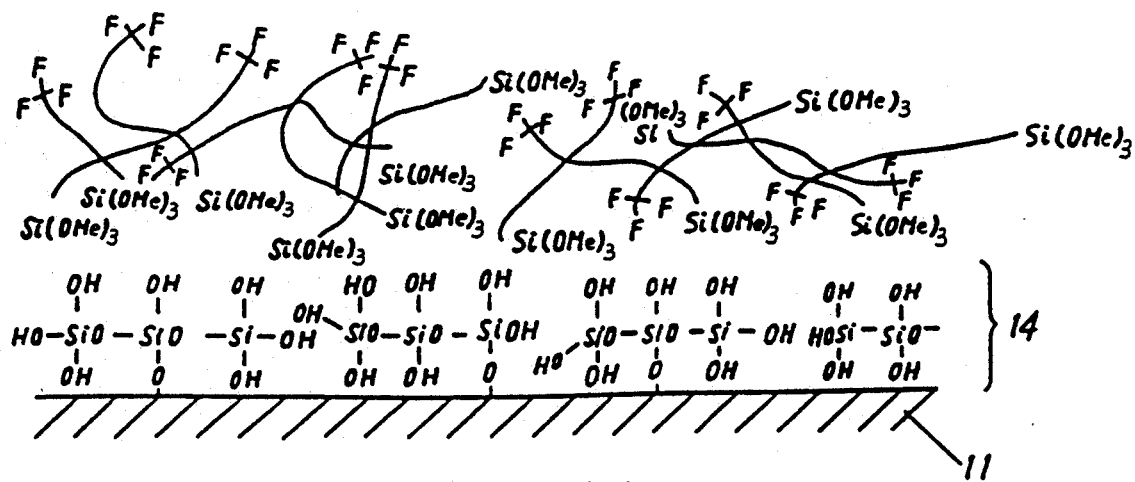
FIG. 4(c) is a schematic sectional view, enlarged in scale to the molecule level showing the fluorocarbon-based polymer film (outer layer) on the siloxane polymer film (inner layer) of Example 4 of this invention.

At this time, hydrochloric acid removal reaction occurred on the surface of the substrate 11 because of the presence of hydrophilic —OH groups on the surface, thus molecules were adsorbed as shown by the formula such as formula [1]. And then the substrate was exposed to an atmosphere containing water, a siloxane monomolecular film 14 as shown in FIG. 4(b) was obtained on the substrate surface, and shown such as the formula [5] and/or formula [6] etc.

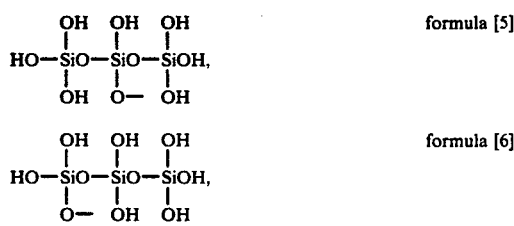

The monomolecular layer 14 thus obtained was never separated as it was perfectly bonded to the substrate 1 iva —SiO— chemical bonds.

The monomolecular layer 14 obtained also had many —SiOH bonds.

Further, a solution was prepared by dissolving to a concentration of 2% wt CF$_3$(CF$_2$)$_7$(CH$_2$)$_2$Si(OC$_2$H$_5$)$_3$ as a compound having a fluorocarbon group and an alkoxysilane group in a methanol solvent, coated on the surface of a substrate 11 covered with a monomolecular film having many —SiOH bonds, followed by baking at 200° C. for about 30 minutes.

Figure 4D:
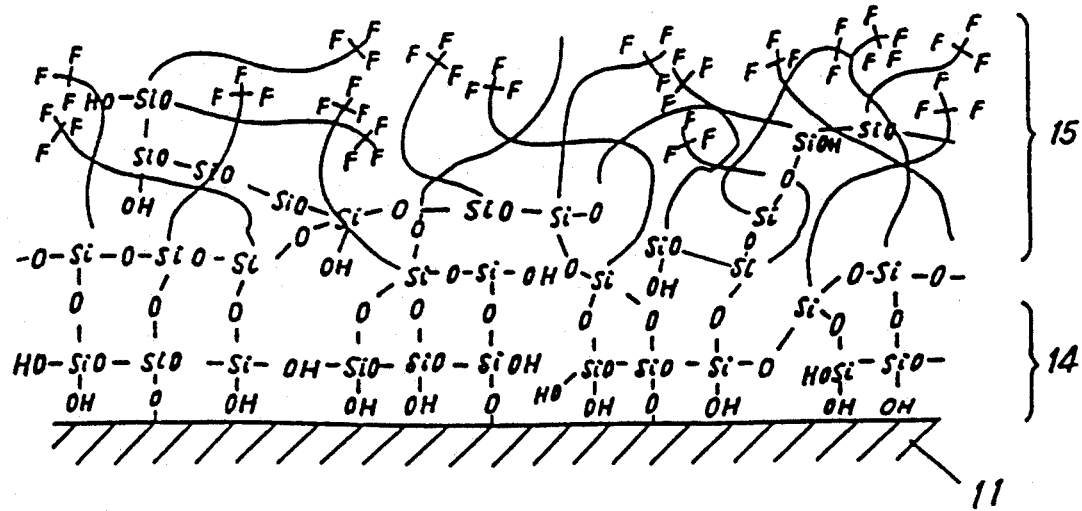
FIG. 4(d) is a schematic sectional view, enlarged in scale to the molecule level showing the fluorocarbon-based polymer film (outer layer) and siloxane polymer film (inner layer) on the surface of a substrate of Example 4 of this invention.

In consequence, it was produced as shown in FIG. 4(d) and shown such as the formula [7].

formula [7]

In this way, a polymer film 15 having a thickness of 10 to 20 μm could be obtained.

The polymer film 15 formed was never separated in a checkerboard test, because it was formed in a state chemically bonded to the siloxane monomolecular film 14.

Further, by adding 10% wt of Si(OC$_3$H$_7$)$_4$ as the cross-linking agent to the solution having a compound containing a fluorocarbon group and an alkoxysilane group, a fluorocarbon-based coating film having about four times of the hardness of the film obtained without addition of the agent could be obtained. Further, by carrying out similar coating using a solution containing a compound having a fluorocarbon group and an alkoxysilane group, in which solution was dispersed 20% wt of fine particles of polytetrafluoroethylene, a fluorocarbon-based coating film could be obtained, which had a very superior adhesion compared to that in the prior art although its hardness was comparable to that in the prior art.

Although in the above Examples 3 and 4, $CF_3CH_2O(CH_2)_{15}Si(OCH_3)_3$ and $CF_3(CF_2)(CH_2)_2Si(OC_2H_5)_3$ were used as a reagent for forming a fluorocarbon-based film on the uppermost surface by adding or assembling the C=C or C≡C group to or in the alkyl chain portion, cross-linking can be caused by irradiation of an electron beam of about 5 Mrads. after the formation of the coating film, a coating film with about 10 times of the hardness to be obtained.

Further, as the compound having a fluorocarbon group and a chlorosilyl group or a fluorocarbon group and an alkoxysilane group, $CF_3(CH_2)_2Si(CH_3)_2(CH_2)_{15}Si(OCH_3)_3$, $F(CF_2)_4(CH_2)_2Si(CH_3)_3(CH_2)_9Si(OCH_3)_3$ and $CF_3COO(CH_2)_{15}Si(OC_2H_5)_3$ may be used, in addition to the compounds noted in the above Examples 1 to 4.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A fluorocarbon polymer film coated substrate comprising a siloxane film consisting essentially of a plurality of interconnected —SiO— groups that are bonded to the substrate surface as an inner layer, and a fluorocarbon-polymer film bonded to the siloxane film as an outer layer, wherein said substrate surface and said inner layer are bonded together with covalent bonds, and said inner layer and said outer layer are bonded together with covalent bonds.

2. A fluorocarbon-based polymer coating film according to claim 1, wherein both of the covalent bonds connecting between said substrate surface and said inner layer, and said inner layer and said outer layer are siloxane bonds.

3. A fluorocarbon-based polymer coating film according to claim 1, wherein said inner layer is formed with a siloxane-based monomolecular film.

4. A fluorocarbon-based polymer coating film according to claim 1, wherein substrate is made of a member of a group consisting of metals, ceramics and plastics.

5. A fluorocarbon-based polymer coating film according to claim 1, wherein substrate is made of a plastic material treated in a plasma atmosphere containing oxygen.

* * * * *